(12) United States Patent
Holloway et al.

(10) Patent No.: US 8,027,841 B2
(45) Date of Patent: Sep. 27, 2011

(54) CENTRALIZED SERVER OBTAINING SECURITY INTELLIGENCE KNOWLEDGE BY ANALYZING VOIP BIT-STREAM

(76) Inventors: J. Michael Holloway, Austin, TX (US); Samuel R. Shiffman, Austin, TX (US)

( * ) Notice: Subject to any disclaimer, the term of this patent is extended or adjusted under 35 U.S.C. 154(b) by 0 days.

(21) Appl. No.: 10/819,387

(22) Filed: Apr. 7, 2004

(65) Prior Publication Data
US 2004/0260560 A1 Dec. 23, 2004

(51) Int. Cl.
*G10L 15/00* (2006.01)
(52) U.S. Cl. .......................................... 704/273; 704/251
(58) Field of Classification Search .................. 704/251, 704/273
See application file for complete search history.

(56) References Cited

U.S. PATENT DOCUMENTS

| | | | |
|---|---|---|---|
| 6,760,420 B2 * | 7/2004 | Heilmann et al. | 379/189 |
| 7,185,368 B2 * | 2/2007 | Copeland, III | 726/25 |
| 2002/0021791 A1 * | 2/2002 | Heilmann et al. | 379/189 |
| 2003/0084188 A1 * | 5/2003 | Dreyer et al. | 709/246 |
| 2003/0212903 A1 * | 11/2003 | Porras et al. | 713/200 |
| 2004/0010718 A1 * | 1/2004 | Porras et al. | 713/201 |
| 2004/0221191 A1 * | 11/2004 | Porras et al. | 714/4 |

* cited by examiner

*Primary Examiner* — Talivaldis Ivars Smits
(74) *Attorney, Agent, or Firm* — The Law Firm of H. Dale Langley, Jr., P.C.

(57) ABSTRACT

Systems and methods provide security intelligence knowledge of network communications. Particularly, VoIP packetized data being communicated over the network, together with other types of data communications over the network, is monitored and detected. From the VoIP packetized data, select portions or streams of the VoIP packetized data are identified. The select packetized data is then matched to a fingerprint or other indicia that indicates that the data is suspect for security intelligence knowledge purposes. The matched data is translated for purposes of taking security precautions based on the content of the security intelligence knowledge so gleaned.

9 Claims, 3 Drawing Sheets

CENTRALIZED SERVER OBTAINING SECURITY INTELLIGENCE KNOWLEDGE BY ANALYZING VOIP BIT-STREAM

BACKGROUND OF THE INVENTION

The present invention generally relates to packetized communications and, more particularly, relates to Voice-over-Internet Protocol (VoIP) network telephony and security intelligence systems and methods therefor.

In Voice-over-Internet Protocol (VoIP) telephony systems, analog voice signals are digitized and transmitted as a stream of packets over a digital data network. These systems enable real-time transmission of the voice signals as packetized data over networks that employ digital network communications protocols, including Transport Control Protocol (TCP), Real-Time Transport Protocol (RTP), User Datagram Protocol (UDP), and other Internet Protocol (IP) and network protocol suites. The digital networks that carry VoIP include the Internet and other digital data communications channels, such as public and private wired or wireless networks, WAN, LAN, WLAN, Wi-Fi, intranets/extranets, enterprise networks, and other conventional communications connectors and implementations and combinations thereof.

In the IP networks for voice communications, individual digital data packets are constructed corresponding to analog voice signals. The packets follow efficient and independent paths over the networks to the intended destination. Packets associated with a particular source in such networks can, thus, take many different paths to the destination for the packets. The packets can arrive at the destination with different delays, arrive out of sequence, or not arrive at all. The destination for the packets must re-assemble and convert the packets back to original analog voice signals.

The current VoIP communications can comply with several possible standards, and it is expected that varied and additional standards will arise. The most commonly followed standard at present appears to be the ITU-T H.323 standard, although other standards employed include H.248, H.323, IETF, ITU, IETF TFC 2885, Media Gateway Control Protocol (MGCP), and Session Initiation Protocol or IETF RFC 2543 (SIP), among others. Generally, each of the various standards in VoIP implementations do not encompass all aspects of VoIP communications. The variations among the various standards, and also the networks and equipment therewith employed, include algorithms, bandwidth allocations, packet loss recovery, compression, speech processing, and other concepts for improved communications, efficiencies, and speed.

In general, the VoIP technology (whatever it may be, in the particular circumstance) allows voice calls originated and terminated at standard telephones supported by the public switched telephone network (PSTN) to be conveyed over IP networks. Gateways for the VoIP digital data packets provide the bridge between the local PSTN and the IP network, at both the originating and terminating sides of a VoIP call. To originate a call, the calling party accesses a nearby gateway, either by a direct connection or by placing a common analog call over the local PSTN and entering the desired destination phone number. The VoIP technology translates the destination telephone number into a network address, i.e., an IP address, associated with a specific terminating gateway at the destination of the call. At the terminating gateway, a call is initiated to the destination phone number over the local PSTN to establish end-to-end two-way communications. Thereafter, the analog voice signals entered on each end are digitized into packets and communicated over the packet network at each respective transmitting gateway, and the digitized packets so communicated are reassembled and translated back into the analog voice signals corresponding to the received packets from the network at each respective terminating gateway.

Security intelligence and prevention of terrorism and similar threats continue to become increasingly important measures in today's society. Digital communications, including, for example, VoIP communications, as with any other types of communication, can be employed in ways that further the threats. Moreover, the current trends towards handling voice communications on VoIP networks—because of the efficiency, cost, and other benefits of digital networks—indicate that VoIP communications will continue and become more pervasive means for communications as time passes. Thus, it is likely that such VoIP communications (as with all types of communications) can and will used by terrorists, criminals and other subversives in furthering illicit schemes of societal threats and concerns.

It would be advantageous in the art and technology to provide new security measures for application to communications in network environments, particularly for VoIP and other digital communications in those environments. The present invention provides security intelligence solutions for VoIP and other types of communications. Furthermore, the present invention provides numerous advantages and improvements in the art and technology.

SUMMARY OF THE INVENTION

An embodiment of the invention is a system for obtaining security intelligence knowledge. The system includes a packetized data detector and a voice recognizer attached to the packetized data detector.

Another embodiment of the invention is a method for obtaining security intelligence knowledge of VoIP communications. The method includes detecting a packetized VoIP data and recognizing an analog voice pattern of the packetized VoIP data Yet another embodiment of the invention is a system for obtaining security intelligence knowledge of a VoIP packetized data. The system includes a packetized data detector for detecting select ones of the VoIP packetized data and a voice recognizer attached to the packetized data detector, for translating the VoIP packetize data to a representation of an analog voice signal.

Another embodiment of the invention is a method for obtaining security intelligence knowledge of VoIP communications. The method includes obtaining a select packetized VoIP data from a network of multiple types of communications and translating the select packetized VoIP data to a representation of an analog voice signal.

BRIEF DESCRIPTION OF THE DRAWINGS

The present invention is illustrated by way of example and not limitation in the accompanying figures, in which like references indicate similar elements, and in which.

DETAILED DESCRIPTION OF THE INVENTION

Figure 1:
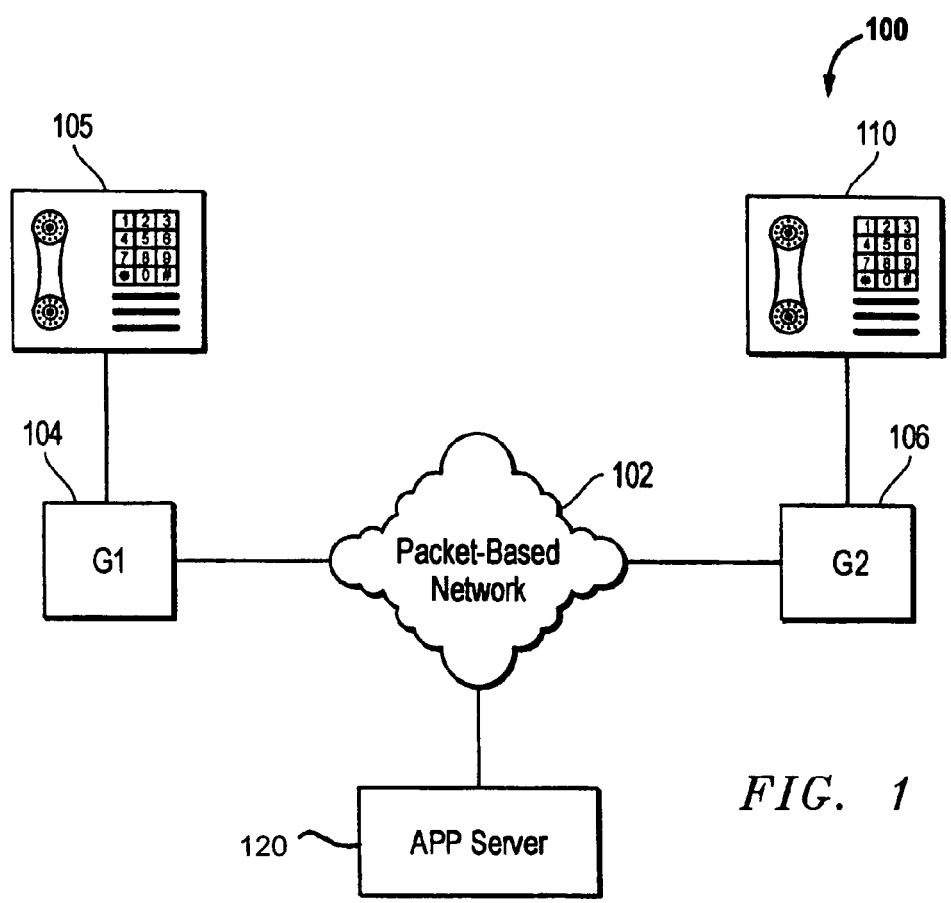
FIG. 1 illustrates a system for obtaining security intelligence knowledge of VoIP communications on a packetized data communications network, such as the Internet, according to certain embodiments of the invention.

Referring to FIG. 1, a system 100 for performing VoIP network security and activity intelligence includes a network 102. The network 102 is any communications system of interconnected communicating devices, such as the Internet, an intranet, a virtual private network, or other directly or indirectly communicatively interconnected individual or pluralities of components, elements, processors, or processes. The network 102 communications are operable according to a packetized protocol, such as the transport control protocol/Internet protocol (TCP/IP) or some other packetized communications protocol. The network 102, such as the Internet, interconnects various computing and communications devices, as is typical. The interconnections of the network 102 are any of a wide variety of communications network connectors, including, for example, wired, wireless, fiber, coax cable, PSTN, cellular, infrared, radio frequency, WAN, LAN, WLAN, Wi-Fi and other conventional communications connectors and implementations and combinations thereof.

The network 102 is connected to a first gateway 104 and a second gateway 106. The first gateway 104 is connected to a first telephone 108, and the second gateway 106 is connected to a second telephone 110. The first telephone 108 and the second telephone 110 can be any of a wide variety of communications input devices, whether or not conventionally identified as "telephone". In any event, the significance of the first telephone 108 and the second telephone 110 with respect to the network 102 is that the network 102 operates by carrying packetized data, whereas the first and second telephones 108, 110 provide output of analog sound signals corresponding to the packetized data carried by the network 102. The first and second gateways 104, 106 connect the first and second telephones 108, 110, respectively, to the network. The gateways convert and translate from packetized data to and from analog signals, and vice versa.

In particular arrangements, the first telephone 108 connects to the first gateway 104 and analog signals pass on the connector between the first telephone 108 and the first gateway. Similarly, in the arrangement, the second telephone 110 connects to the second gateway 106 such that analog signals pass on the connector therebetween. Although the first and second telephones 108, 110 are illustrated in FIG. 1 as independent devices from the respective first and second gateways 104, 106, the telephone and gateway can be combined or otherwise implemented in any particular configuration. Moreover, other or additional devices can be included as and for the connector between any respective telephone and gateway, such as telephone switches and the like. In essence, the FIG. 1 illustration is merely intended as exemplary, but not in any manner restrictive, in order to show the analog and digital packetized sources and correspondence of those sources.

The first and second gateways 104, 106 each receive from and send to the respective first and second telephones 108, 110, various communications corresponding to packetized data at the first and second gateways 104, 106 from the network 102. The gateways 104, 106, or elements configured or attached thereto, communicate over the network 102 according to packetized communications protocols of the network 162. For example, the network 102 between the gateways 104, 106 can be the Internet and digitized data packets are communicated thereover according to TCP/IP and other Open Source Interconnect (OSI) model protocols.

Continuing to refer to FIG. 1, a security intelligence application server 120 is communicatively connected to the network 102. The server 120 is connected to the network 102 at any point in the network 102 suitable for providing application services over and on the network 102. Particularly, VoIP communications over the network 102 are routed through the server 120 in embodiments. Alternatively, desired information about or of the VoIP communications over the network 102, is routed through the server 120.

The server 120 performs several distinct application steps to provide security intelligence information regarding VoIP communications so routed over the network 102. The server 120 is a computer, a software application, an independent processing device, or any of a wide variety of other elements or combinations of elements that are capable of providing the functionality of the server 120 in security intelligence as described herein. Although as herein illustrated and specifically described the security intelligence application server 120 is a server computer of the network 102, the server 120 and its functionality could be included in any router, switch or other device of the network 102 or as an extension or addition to the network 102.

Figure 2:
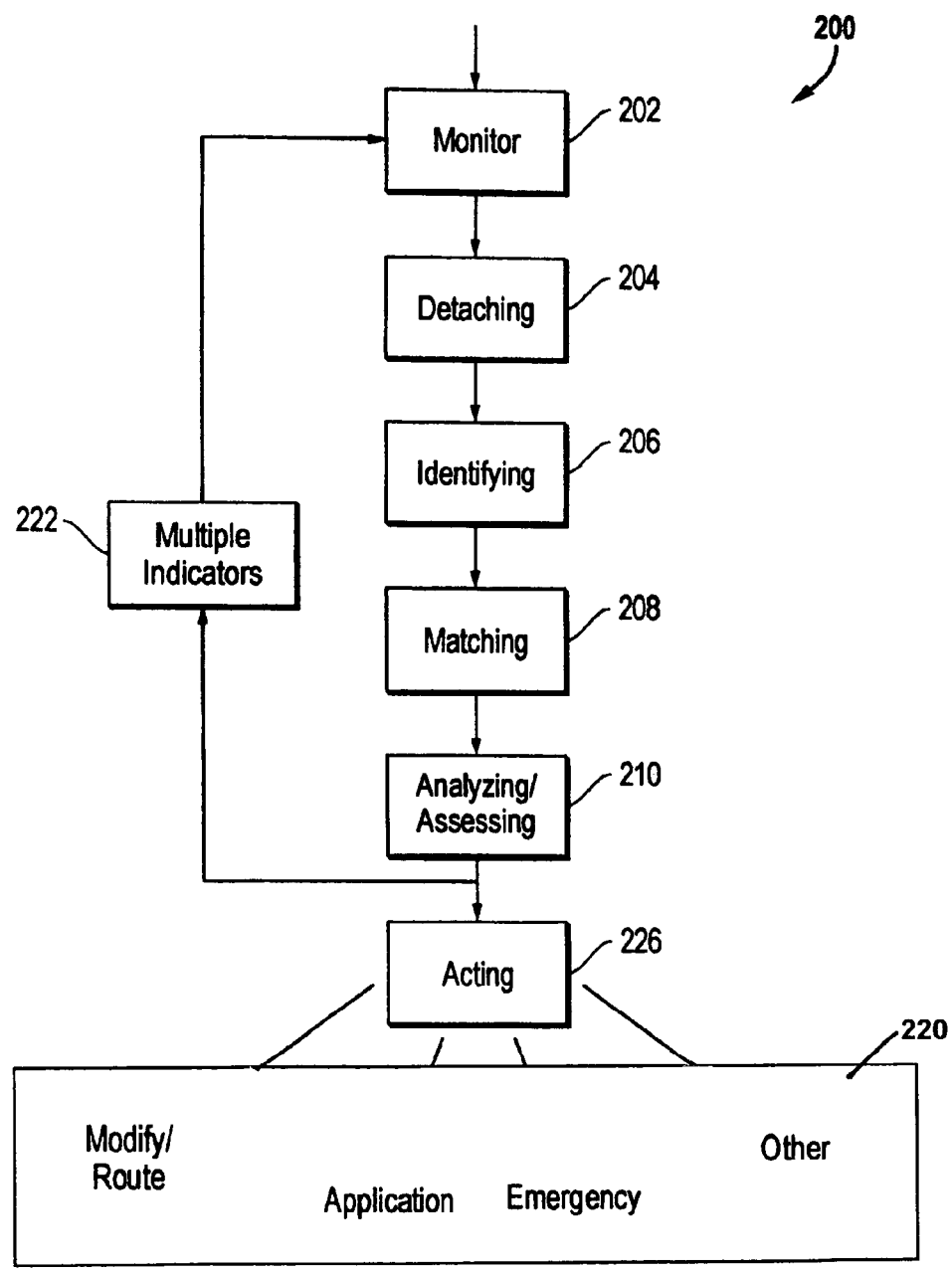
FIG. 2 illustrates a method for obtaining security intelligence knowledge of VoIP communications on a packetized data communications network, such as the Internet, according to certain embodiments of the invention.

Referring to FIG. 2, the security intelligence application server 120, in any event, performs several functions of a method 200. The server 120 monitors VoIP communications of packetized voice data on the network 102; detects desired information from or of the data packets in the VoIP communications; identifies fingerprints, i.e., particular bit streams, within the data packets; and acts on matches of the fingerprints indicative of security or other intelligence or information. The method 200 provides security intelligence monitoring and knowledge of VoIP communications in a network, for example, the network 102. In the method 200, a step 202 monitors a communications channel for packetized voice data, for example, VoIP data packets in VoIP communications over a network. The step 202 of monitoring can be continuous, intermittent, or as otherwise desired in the particular security intelligence arrangement.

During the step 202 of monitoring, a step 204 of detecting determines that particular, desired data or information is then being communicated. The detecting step 204 ascertains, in real time, particular data bits, such as a particular bit stream or streams of the data as and when being communicated. The particular data detected in the step 204 is packetized voice data, such as in VoIP signals. Moreover, the particular data detected in the step 204 is shown in the step 204 because of particular significance of the data, such as from match of the data as having significance to a fingerprint or other indicator. Herein, the terms "suspect data" or the like may sometimes be used to refer to data having particular significance or import as determined via the step 204 or otherwise; for example, suspect data can be security intelligence-related data or other applications data.

In a step 206 of the method 200, the selected particular data detected in the step 204 is identified as having significance or importance, by virtue of a characteristic of the data or of a sender or other relevant characteristic of or to the data. For example, the characteristic for identification in the step 204 can include such details as a fingerprint or match of data bits, a sending or receiving address, a communications pathway or protocol, a type of the data, or other characteristic or combination of characteristics. In any event, the identifying step 206 distinguishes the particular data as important to security intelligence knowledge or information involving VoIP communications.

A step 208 of matching is then performed with the identified data from the step 206. The matching step 208 functions to bit pattern match the VoIP data to bit patterns (i.e., fingerprints) maintained in a directory or database associated with the method 200. In the step 208, packetized data is compared to the database of data fingerprints. The data fingerprints of the database are indicative of VoIP information that, on voice recognition operations with the fingerprints, yields voice information that is important to security or other applications. For example, packetized data that is detected and identified in the method 200 as having significance to security intelligence, is compared to the data fingerprints of the database. The data fingerprints are each, themselves, select packetized VoIP data strings or sequences that have security intelligence significance when voice recognized. The step 208 looks-up detected and identified data to determine any match to the data fingerprints of the database.

If there is any match in the step 208 (either an exact, substantial, or other match, as desired for security intelligence operations), then the detected packetized VoIP data is analyzed and assessed in a step 210 of the method 200. In the step 210, a wide variety of logical operations can be performed with the VoIP data. For example, calculations of extent of match, fetch and analysis of additional data from the same or otherwise related source, retention of particular data sequences and data of particular timing or genre, and other analyses and assessment is performed. As those skilled in the art will understand and appreciate, the step 208 can include any of a wide variety of operations intended to gain security intelligence knowledge from the particular packetized VoIP data and also from the related communications, sources, channels, timing, and other aspects of the particular data, in order to more fully glean desired knowledge of communications.

Upon performance of the step 210, the method 200 can proceed in several ways. In one of the ways, certain steps of the method 200 can be repeated, on the data or other data and the like, as indicated by the feedback loop of a step 222. For example, additional VoIP data can be monitored, detected and so forth, to ascertain multiple indicators or greater knowledge of security intelligence-related VoIP communications and other data communications. Of course, the repeated steps of the method 200 and the desired results from the repetition in any instance is dictated by the objective of the security intelligence determinations and the implementation to achieve the objectives.

Another way that the method 200 can proceed is indicated by a step 220. In the step 220, an ancillary action to the method 200 is triggered. This ancillary action of the step 220 can be any of a wide variety of steps or activities, for example, a notification, flag, initiation of another application, emergency precaution, or other next act. In certain embodiments, the step 220 will either directly, or indirectly after performance of additional processing or other operations, serve to notify proper authorities of the security intelligence knowledge observed and obtained in the method 200. For example, the step 220 can include such actions as notifying law enforcement authorities, signaling crises, invoking particular computerized or network response, or any of numerous other possibilities.

Figure 3:
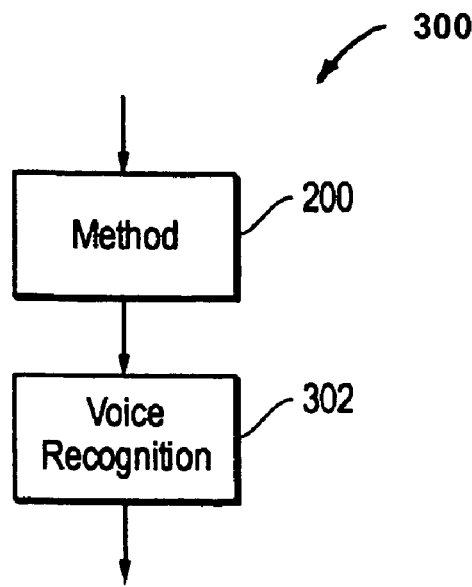
FIG. 3 illustrates a method, expanding on the operations of the method of FIG. 2, for performing voice recognition operations and translation of VoIP communications, according to certain embodiments of the invention.

Referring to FIG. 3, a particular way that the method 200 can proceed includes a next step 302 of voice recognition, in an expanded method 300. In the method 300, the method 200, on completion of the step 220, passes the suspect VoIP packetized data to a voice recognition application. The voice recognition application performs the recognizing step 302. The voice recognition step 302 translates the suspect VoIP data to understandable language, for example, into an English-language transcript useable by a human of the substantive information of the voice communication data. The voice recognition step 302 can include features for distinguishing, recognizing and making useable any of a wide variety of languages, multiple languages, varied dialects, and the like. The step 302 can also include or invoke additional operations with or on the voice information, as translated or otherwise of useable form. For example, encryption or other scrambling or secretly coded and so forth, can be decrypted and deciphered in or in conjunction with the step 302. The actions in the step 302 can include both automated and manual processes, as applicable.

Figure 4:
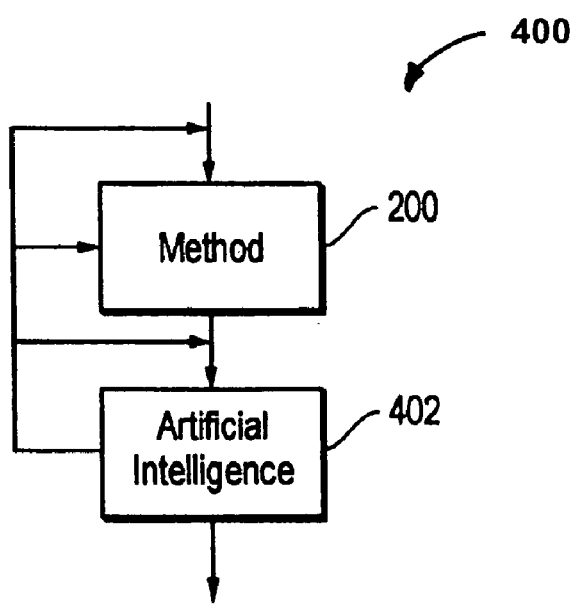
FIG. 4 illustrates a method, expanding on the operations of the method of FIG. 2, for varying the steps and results of the method of FIG. 2 in accordance with an artificial intelligence (or learning) process for the method, according to certain embodiments of the invention.

Referring to FIG. 4, a method 400 includes steps of the method 200 and an additional step 402 of artificial intelligence—e.g., or "learning". In the step 402, the method 200 is refined, tweaked and adjusted, in the various steps thereof, in order to progressively better operate for providing security intelligence knowledge. Particularly, the step 402 can continuously cause bit stream fingerprints to be added to the database for matching operations. Also, the step 402 can narrow or more specifically focus detection to more desirable streams of the VoIP data over the network. The step 402 can also serve to change variables and operations of any voice recognition functions, based on the detection and other steps of the method 200. Notwithstanding the specific possibilities for the step 402 just listed, the step 402 can include any of a wide variety of other or additional functions, steps, and actions, depending on the desired results of the method 400 and other factors.

The specific embodiments herein described are examples, and are not intended to be and are not exclusive, as scalability and other physical and logical constraints and opportunities can be exploited in any particular implementation or arrangement in practice. As for scalability, the systems and methods can be physically or virtually located, as the case may be, at any appropriate gate, device, switch, router, server, or other feature of the VoIP communications channels and network. The decision of location and configuration at a switch, router, server, or other feature of the network can include consideration of factors of the extent of any sampling versus logical detection schemes, or other implementation events. For example, if random sampling of continuous data streams is employed for detection of particular VoIP packets, then greater physical requirements of storage and processing can be required, than in situations in which some mechanism is included to detect only certain indices or criteria of the entire data streams in order to obtain the particular VoIP packets. Numerous variations, too extensive and variable to each describe specifically herein, but which will be understood and apparent to those skilled in the art, based upon all the foregoing, are possible. All such variations are included here.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments.

However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for obtaining security intelligence knowledge of a plurality of VoIP calls, each VoIP call initiated by a respective caller device and destined for one or more respective recipient device, comprising:
   a digital packet-switched communications network connected to each respective caller device and each one or more respective recipient device, for transporting the plurality of VoIP calls;
   a security intelligence application server connected to the network for receiving the plurality of VoIP calls in transit on the network between each respective caller device and each one or more respective recipient device for each VoIP call, the plurality of VoIP calls each being routed through the server during connection of the VoIP call between the respective caller device and the one or more respective recipient device;
   a monitor of the server for distinguishing the plurality of VoIP calls routed through the server from other communications routed through the server over the network;
   a database of a plurality of select bit stream fingerprints, each select bit stream fingerprint represents a suspect audible content of security intelligence information;
   a packetized data detector connected to the monitor of the server and the database, for detecting any of the plurality of select bit stream fingerprints in the plurality of VoIP calls, if present; and
   an analysis and assessment unit of the server for processing as suspect any of the plurality of VoIP calls having any of the plurality of select bit stream fingerprints.

2. A system for obtaining security intelligence knowledge of a plurality of VoIP calls communicated on the Internet, comprising:
   respective VoIP data of each of the plurality of VoIP calls routed by the Internet;
   a centralized application server connected to the Internet for receiving the respective VoIP data of the plurality of VoIP calls in route on the Internet;
   first communications devices connected to the Internet, each for initiating a respective one of the plurality of VoIP calls on the Internet;
   second communications devices connected to the Internet, each respective one of the plurality of VoIP calls being destined for receipt from the Internet by at least one of the second communications devices;
   a centralized application server connected to the Internet remote from the first communications devices and the second communications devices, for receiving the respective VoIP data of the plurality of VoIP calls in route on the Internet between the first communications devices and the second communications, respectively;
   a storage connected to the server containing a plurality of data fingerprints, the data fingerprints representing suspect security content of VoIP data;
   a fingerprint detector of the server, for identifying any of the VoIP data of the VoIP calls matching any of the data fingerprints, from among the VoIP calls routed through the server by the Internet;
   a voice recognizer connected to the detector, for deriving audible content of any of at least a select portion of any of the VoIP calls containing the VoIP data matching the fingerprint identified by the detector; and
   an artificial intelligence controller, connected to the voice recognizer and the fingerprint detector, for varying operations of the detector based on at least a portion of the VoIP data of any VoIP calls containing the VoIP data matching the fingerprint.

3. A method for obtaining security intelligence knowledge of VoIP calls, comprising the steps of:
   routing a plurality of VoIP calls of a digital packet-switched network to a centralized server connected to a database of data bit fingerprints, the centralized server is located between respective originating and destination gateways of the network for respective ones of the plurality of VoIP calls;
   receiving by the centralized server the plurality of VoIP calls transported on the network from the respective originating gateway of the network for each of the plurality of VoIP calls, each VoIP call of the plurality of VoIP calls comprised of a respective unique VoIP data bit stream representing a voice call;
   comparing by the centralized server the unique VoIP data bit stream of each VoIP call of the plurality of VoIP calls to the data bit fingerprints of the database;
   detecting by the centralized server any VoIP data bit stream of any of the VoIP calls of the plurality of VoIP calls matched to the data bit fingerprints of the database;
   analyzing by the centralized server each VoIP call of the VoIP data bit stream matched to the data bit fingerprints, for security intelligence criteria accessible to the centralized server;
   processing via the centralized server each VoIP call of the VoIP data bit stream matched to the data bit fingerprints, to obtain an analog voice pattern represented by the respective VoIP call;
   analyzing via the centralized server whether the analog voice pattern of the respective VoIP call contains security intelligence information;
   determining by the centralized server a destination of the digital packet-switched network for any respective VoIP call of security intelligence information on the network based on the step of analyzing;
   routing by the centralized server any respective VoIP call of security intelligence information to the destination of the digital packet-switched network from the step of determining by the centralized server, otherwise, routing the VoIP call by the centralized server to the destination gateway.

4. The method of claim 3, further comprising the step of:
   repeating the steps of detecting, processing and analyzing for duration of each VoIP of the plurality of VoIP calls;
   varying by the centralized server at least one of the steps of detecting, processing and analyzing in the step of repeating for at least one of the respective VoIP call as the respective VoIP call continues, based on results of at least one of the prior steps of detecting, processing and analyzing for the respective VoIP call of the plurality of VoIP calls.

5. The method of claim 3, further comprising the steps of:
   performing the steps of routing, receiving, comparing, detecting, analyzing by the centralized server, processing, analyzing via the centralized server, determining and recognizing for a subsequent pluralities of VoIP communications; and varying via the server the select bit stream detected in the step of performing in respect of the subsequent pluralities of VoIP communications, based on at least one of the unique VoIP data bit stream of one or more of the plurality of VoIP calls of any one or more prior step.

6. The method of claim 5, wherein the step of varying is automated via the server.

7. The system of claim 3, further comprising the step of varying the step of detecting based on at least one of the unique VoIP data bit stream of any of the plurality of VoIP calls matched to the data bit fingerprints of the database.

8. A system for obtaining security intelligence knowledge of a plurality of communications each comprising a respective unique VoIP packetized data of the respective communication carried on a digital packet-switched network and initiated from an origination gateway of the network and destined for a destination gateway of the network, comprising:
- a centralized server of the network communicating between the origination gateway and the destination gateway for communications between the origination gateway and the destination gateway, the plurality of communications being routed through the centralized server;
- a packetized data detector, connected to the server, for detecting the respective unique VoIP packetized data of each of the plurality of communications;
- a database connected to the packetized data detector;
- a table of the database containing a patterned sequence of suspect bit data representing security intelligence knowledge when voice recognized;
- wherein the packetized data detector performs a lookup in the database with respect to each communication received by the server for presence of the patterned sequence in the respective unique VoIP packetized data of the communication; and
- a voice recognizer connected to the packetized data detector, for translating the respective VoIP packetized data, if the patterned sequence is present, to a representation of an analog voice signal;
- wherein the communication for duration passes through the centralized server as carried over the network between the originating gateway and the destination gateway.

9. A method for ascertaining a security condition of a plurality of VoIP communications between a plurality of respective entry gateways of a packetized switched data network, comprising the steps of:
- routing the plurality of VoIP communications, in entirety and for duration of each of the respective VoIP communications, through a centralized server of the network in route to a respective destination of the network for each respective VoIP communication;
- looking up a select bit pattern by the server in a database, the select bit pattern when voice recognized indicates the security condition;
- detecting by the server any presence of the select bit pattern in any of the plurality of VoIP communications;
- identifying by the server the respective VoIP communication of the plurality if comprising the select bit pattern; and
- translating via the server, the respective VoIP communication of the plurality if comprising the select bit pattern, to a representation of an analog voice signal; and
- automatedly initiating by the server a security response, in respect of any VoIP communication with the select bit pattern.

* * * * *